United States Patent [19]

Broecker et al.

[11] 3,896,053

[45] July 22, 1975

[54] NICKEL-CONTAINING HYDROGENATION CATALYSTS FOR THE SELECTIVE HYDROGENATION OF FATS AND OILS

[75] Inventors: Franz Josef Broecker; Juergen Heners, both of Ludwigshafen; Laszlo Marosi, Speyer; Matthias Schwarzmann, Limburgerhof; Peter Rudolf Laurer, Ludwigshafen, all of Germany

[73] Assignee: Badische Anilin- & Soda-Fabrik Aktiengesellschaft, Ludwigshafen, Rhine, Germany

[22] Filed: June 7, 1973

[21] Appl. No.: 367,949

[30] Foreign Application Priority Data
June 10, 1972 Germany .................. 22 28 332

[52] U.S. Cl. .................. 252/466 J; 260/409
[51] Int. Cl. .................................. B01j 11/22
[58] Field of Search .............. 252/443, 463, 466 J; 260/409; 423/600

[56] References Cited
UNITED STATES PATENTS

| | | | |
|---|---|---|---|
| 3,629,153 | 12/1971 | Pryor | 252/463 |
| 3,723,353 | 3/1973 | Eurlings et al. | 252/466 J |

Primary Examiner—Winston A. Douglas
Assistant Examiner—W. J. Shine

[57] ABSTRACT

The double salt $Ni_6Al_2(OH)_{16} \cdot CO_3 \cdot 4H_2O$ is obtained from an aqueous solution containing nickel and aluminum salts by precipitation with alkali metal carbonate or bicarbonate. This double salt (catalyst precursor) is dried, calcined and reduced. There is thus obtained a catalyst which is suitable for the selective hydrogenation of fats and oils.

2 Claims, 1 Drawing Figure

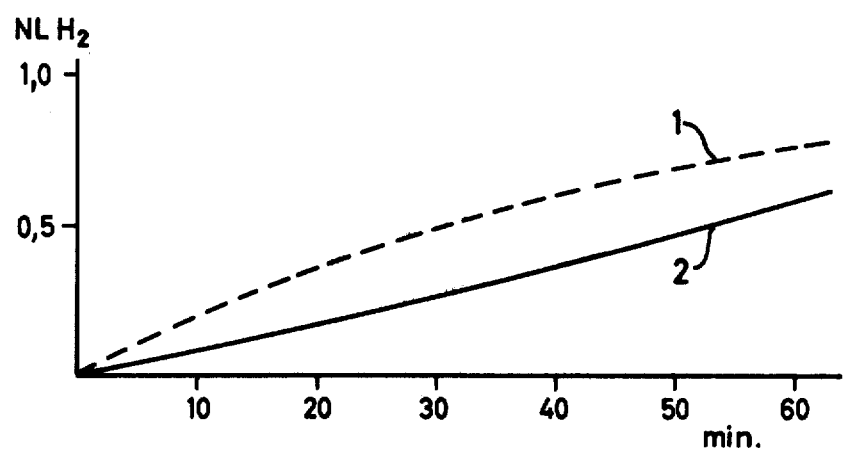

NICKEL-CONTAINING HYDROGENATION CATALYSTS FOR THE SELECTIVE HYDROGENATION OF FATS AND OILS

The present invention relates to the use of nickel-containing hydrogenation catalysts for the selective hydrogenation of fats and oils. The catalyst is obtained from a precursor forming part of a specific series of mixed crystals and produced by coprecipitation from aqueous solution.

The addition of hydrogen to unsaturated fatty acids or their glycerides in the presence of catalysts is known as hardening. Industrial hardening of vegetable and animal oils for the production of edible fats or solid fats gained increasing significance at the turn of the century following the research carried out by Normann.

The chemical reactions which take place during fat hardening are very complicated and are often reproduced in simplified form by the following scheme, in which merely the addition of hydrogen is considered and no account is taken of reactions such as isomerizations or rearrangements:

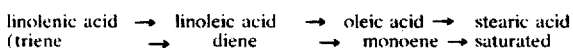

Selective hydrogenation may be simply described as the addition of hydrogen to triunsaturated or diunsaturated fatty acids or their glycerides to form oleic acid or oleic acid glycerides showing monounsaturation.

As mentioned above, however, the hydrogenation of fats and oils is very complicated and besides the addition of hydrogen to double bonds, dehydrogenation processes take place so that not only position isomeric oleic acids but also stereoisomeric oleic acids may be formed in the selective hydrogenation of polyunsaturated fatty acids.

To summarize, it may be said that the selective hydrogenation of a polyunsaturated fatty acid glyceride (single component) present in oils and fats has not yet been achieved. It has not been possible to control the entire reaction uniformly and selectively either by using nickel, cobalt, platinum, palladium or any other catalysts or by varying the reaction conditions such as the amount of hydrogen used, the pressure, the hydrogenation temperature and hydrogenation time. (Cf. "Tenside" — Zeitschrift fur Physik, Chemie und Anwendung granzflachenaktiver Stoffe —, 3rd year, No. 8, Aug. 1966, pp. 285–296, "Probleme der Fetthartung").

In said article, the catalysts used for fat hardening are reviewed on pp. 286 and 287.

From this it is seen that noble metal catalysts such as palladium and platinum are eminently suitable for hydrogenation at low temperatures (below 100°C) on account of their very high activity, but these catalysts are not used for fat hardening on a large scale for economical reasons.

Nickel catalysts prepared from Raney alloys are used for fat hardening to a certain extent, although they are less active than supported nickel catalysts. Nickel catalysts prepared from Raney alloys can frequently only be removed from the hardened substrate by means of filter aids and this is a great disadvantage.

According to the writer of said article, the preferred catalysts for industrial use in the hardening of fat are nickel-on-kieselguhr catalysts. The best method of making highly active nickel-on-kieselguhr catalysts is the electrolytic precipitation of nickel in the form of its hydroxide onto kieselguhr. The activity and life of nickel-on-kieselguhr catalysts (cf. loc. cit. pp. 286 and 287) is however very much dependent on the type of nickel and its precipitation onto the support. For this reason it is not possible to manufacture standardized catalysts in the case of nickel-on-kieselguhr catalysts.

It is an object of the invention to provide supported nickel catalysts for hydrogenation of vegetable and animal oils, which catalysts are characterized by reproducible activity regarding the hardening of fats. It is a further object to provide highly active catalysts based on base metals, in order to reduce the hydrogenation times or to make it possible to reduce the reaction temperatures used for hardening the various oils and fats.

We have now found, surprisingly, that vegetable and animal oils may be selectively hardened to high quality fats under reproducible conditions when a supported nickel catalyst which has been obtained from a specific precatalyst is present.

Thus the invention relates to a supported nickel catalyst for selective hydrogenation of fats and fatty acids, which is characterized in that it has been prepared from a compound of the formula:

in which $Me^{(2+)}$ denotes nickel, copper or cobalt, which has been precipitated from the aqueous phase, by subsequent washing, filtering, drying calcination and reduction thereof with hydrogen at temperatures ranging from 200° to 600°C.

The catalyst of the invention shows even at low temperatures a substantially higher activity than prior art nickel-on-kieselguhr catalysts (cf. Example and, in particular, Table I below).

The precursor is part of a series of mixed crystals which may be generally represented by the following formula:

The divalent metal is preferably nickel. It may be replaced, in this mixed crystal, partially or entirely by some other divalent metal having a similar ion radius, for example Cu(II) or Co(II), without the structure of the precursor being substantially changed thereby.

The catalyst precursor is prepared by precipitation from aqueous solution at temperatures of between 50° and 95°C, preferably between 75° and 85°C. During precipitation, the pH is maintained between 4.0 and 8.5 and preferably between 4.5 and 6.5. Precipitation is effected from 1M to 2M aqueous solutions of the nitrates of nickel, copper or cobalt and aluminum with 1M to 2M solutions of alkali metal carbonate. We prefer to use sodium carbonate or bicarbonate solution as precipitant.

The precipitate is filtered off and washed, dried at temperatures ranging from 100° to 150°C and preferably from 110° to 120°C, and then calcined at temperatures of between 300° and 500°C and preferably from 340° to 370°C.

The catalyst proper is obtained from the precursor by reduction at temperatures ranging from 200° to 500°C and preferably from 350° to 500°C.

A substantial advantage in preparing the catalyst via this precursor is that simple X-ray analysis of the precursor makes it possible to check the quality of the precipitation. (The precipitated compound is checked against the characteristic d-values 7.75; 3.88, 2.63, 2.58, 2.30, 1.96, 1.77, 1.66, 1.525, 1.492, 1.42 and 1.30 A). This control of the precipitation of the precatalyst ensures that the reduced catalyst will have the desired activity values.

The catalyst of the invention may be used for the hydrogenation of animal and vegetable oils, examples of which are vegetable oils such as olive oil, soy bean oil, sunflower oil and arachis oil or animal oils such as whale oils and fish oils.

Fat hardening may be carried out at atmospheric or elevated pressures of up to 50 atmospheres. We prefer to operate at atmospheric pressure or at pressures of up to 5 atmospheres.

Hydrogenation may be carried out at temperatures of between 80° and 160°C and preferably at from 100° to 140°C. The choice of hydrogenation temperature or temperature range is governed by the starting material used. However, it is considerably lower than the temperatures used with prior art nickel-on-kieselguhr catalysts, since in the latter case temperatures of from 140° to 180°C are generally used. The catalysts of the invention are considerably more active at temperatures of between 100° and 140°C than nickel-on-kieselguhr catalysts. This is shown in FIG. 1, in which olive oil is hydrogenated at 100°C with a nickel-on-kieselguhr catalyst obtained by electrolytic precipitation of nickel onto kieselguhr, and also with a catalyst of the invention for comparison. In this FIGURE, the hydrogen absorbed is plotted against time (in minutes). As may be seen from the FIGURE, the catalyst of the invention produces a hydrogen absorption against time (curve 1) which is considerably better than that (curve 2) obtained using a prior art catalyst. Thus the catalyst of the invention is distinguished by its superior hydrogenation activity, particularly at low temperatures, as compared with prior art catalysts. The use of low temperatures in the hydrogenation of vegetable and animal oils has itself the advantage that the addition of hydrogen may be carried out more selectively, i.e., the poly-unsaturated fatty acids or glycerides thereof may be selectively hydrogenated down to the mono-unsaturated fatty acids such as oleic acid or glycerides thereof.

The preparation of the catalyst of the invention is described below in Example 1. The use of the catalyst of the invention in the hydrogenation of vegetable and animal fats and oils is described in the subsequent Examples. Examples 2 to 5 (cf. Tables 1 to 4 and the FIGURE) demonstrate the superiority of the catalyst of the invention over prior art catalysts. (In all comparative tests, the prior art catalyst used is a nickel-on-kieselguhr catalyst prepared by electrolytic precipitation of nickel onto the substrate.

EXAMPLE 1

For the preparation of the precursor of the following formula:

$$Ni_6Al_2(OH)_{16}CO_3 \cdot 4H_2O$$

the following solutions are prepared:

Solution 1
  55.840 kg (192 moles) of $Ni(NO_3)_2 \cdot 6H_2O$ and
  24.008 kg (64 moles) of $Al(NO_3)_3 \cdot 9H_2O$ are dissolved in $H_2O$ to give a solution totaling 128 liters (2M solution).

Solution 2
  30.540 kg (288 moles) of $Na_2CO_3$ (commercial soda) are dissolved in $H_2O$ to give a solution totaling 144 liters (2M solution).

40 liters of water are placed in a precipitating vessel. Solutions 1 and 2 and the contents of the precipitating vessel are separately heated to approx. 80°C. Enough solution 1 is then added to the precipitating vessel with stirring until a pH of 5 is reached. The remainder of solution 1 is then added at a rate of approx. 32 l/hr whilst solution 2 is added so as to maintain a pH of from 4.5 to 5.5. Not until all of the nitrate solution has been added (after about 4 hours) is the remainder of the soda solution added to give a pH of 6.5. The mixture of aqueous phase and precipitate is stirred for a further 15 minutes of 80°C and the precipitate is then filtered off and washed until no more nitrate can be detected in the filtrate.

The washed precipitate is dried at 110°C and the precursor thus obtained is calcined (decomposed) for 20 hours at 350°C and finally reduced in a stream of hydrogen for 20 hours at from 400° to 470°C.

As is usual in oil hardening processes, the reduced catalyst is made up into master batches of catalyst embedded in hydrogenated fat, which master batches contain from 15 to 25% by weight of nickel per kg of hydrogenated fat.

Alternatively, the calcined precursor may be stored as it is and reduced just before introduction into the substrate to be hardened. However, this procedure has not yet been adopted in practice.

EXAMPLE 2

A catalyst as prepared in Example 1 was compared with a prior art catalyst (nickel-on-kieselguhr catalyst) for the hydrogenation of olive oil (1 atmosphere absolute of hydrogen, stirring rate 1,000 r.p.m., catalyst concentration 0.9% w/w of nickel, based on 1 kg of oil) at various temperatures up to a temperature of 160°C. The results listed in Table 1 below show that the catalyst of the invention is far superior to the prior art catalyst, particularly at low temperatures (cf. hydrogen absorption data).

The graph shown in the accompanying FIGURE depicts the hydrogen absorbed, as ordinates in units of 1 liter (STP) plotted against time (in minutes) for a prior art nickel-on-kieselguhr catalyst (curve 2) and a catalyst of the invention (curve 1) in the hydrogenation of olive oil at 100°C.

TABLE 1

|  | Invention (Ex. 1) | | | Prior art (Ni-on-kieselguhr) | | |
|---|---|---|---|---|---|---|
| Temp. °C | 160 | 130 | 100 | 160 | 130 | 100 |
| $H_2$ absorbed* | 26.1 | 17.1 | 7.7 | 23.5 | 6.1 | 0.0 |

*liters (STP) per kg of oil per hour.

EXAMPLE 3

Table 2 shows the results obtained using the catalyst of Example 1 in comparison with those obtained with the prior art nickel-on-kieselguhr catalyst in the hydrogenation of arachis oil. The reaction was carried out using in each case 100 g of oil at a stirring rate of 1,000 r.p.m. and 0.09 g of nickel.

To achieve a hydrogen absorption of 2.5 l (STP) at 100°C, the catalyst of the invention required a hydrogenation time of 120 minutes, due to its superior activity over the prior art catalyst, which required 154 minutes. The catalyst of the invention is also superior to that of the prior art in its selective properties, since it converts less linoleic acid and, in particular, less oleic acid to stearic acid than is the case with the prior art catalyst.

TABLE 2

Hydrogenation of 100 g of arachis oil at 100°C

|  | Starting oil | Hydrogenated oil | |
|---|---|---|---|
|  |  | Invention | Prior art |
| $C_{16}$ palmitic acid (%) | 11.3 | 11.5 | 11.5 |
| $C_{18}$ stearic acid (%) | 3.0 | 8.9 | 11.0 |
| $C_{18}'$ oleic acid (%) | 39.2 | 63.3 | 57.3 |
| $C_{18}''$ linoleic acid (%) | 42.7 | 12.3 | 15.3 |
| $C_{18}'''$ linoleic acid (%) | 1.5 | 0.5 | 0.4 |
| iodine number | 101 | 74.8 | 74.5 |
| saponification number | 190 | 189 | 189 |
| $H_2$ absorbed (liters) | — | 2.5 | 2.5 |
| hydrogenation time (min) | — | 120 | 154 |

EXAMPLE 4

The catalysts mentioned in Example 3 were again compared with respect to their activity in the hydrogenation of soy bean oil. 0.09 g of nickel were used on 100 g of the substrate to be hardened and hydrogenation was carried out at 120°C until 5.0 liters of hydrogen (STP) had been absorbed at a stirring rate of 1,000 r.p.m. The results are listed in Table 3 below. In addition to the higher activity (giving shorter hydrogenation times), the catalyst of the invention also shows better selectivity (reduced formation of stearic acid).

TABLE 3

|  | Starting oil | Hydrogenated oil | |
|---|---|---|---|
|  |  | Invention | Prior art |
| $C_{16}$ palmitic acid (%) | 10.4 | 9.8 | 10.8 |
| $C_{18}$ stearic acid (%) | 4.3 | 7.7 | 13.4 |
| $C_{18}'$ oleic acid (%) | 24.0 | 76.3 | 64.9 |
| $C_{18}''$ linoleic acid (%) | 52.6 | 4.2 | 9.5 |
| $C_{18}'''$ linolenic acid (%) | 8.0 | — | — |
| iodine number | 130 | 74.9 | 73.6 |
| saponification number | 193 | 189 | 190.7 |
| $H_2$ absorbed (liters) | — | 57 | 68 |
| hydrogenation time (min) | — | 5.0 | 5.0 |

EXAMPLE 5

Whale oil was hydrogenated at 180°C in the manner described in the previous Examples at a stirring rate of 1,000 r.p.m. The results (cf. Table 4) show that hydrogenation by the process of the invention is still very selective even at relatively high temperatures.

TABLE 4

|  | Whale oil Before hydrogenation | After hydrogenation |
|---|---|---|
| $H_2$ pressure (at.) | — | 1 |
| Hydrogenation time (min) | — | 60 |
| Catalyst conc. (% w/w Ni in oil) | — | 0.9 |
| $H_2$ absorbed (1/100 g of oil) | — | 2.89 |
| $C_{16}$ palmitic acid (%) | 15.1 | 18.2 |
| $C_{18}$ stearic acid (%) | 2.7 | 4.3 |
| $C_{18}'$ oleic acid (%) | 31.9 | 38.6 |
| $C_{18}''$ linoleic acid (%) | 6.7 | 3.6 |
| $C_{18}'''$ linolenic acid (%) | 8.0 | 7.2 |
| Iodine number | 117 | 94.7 |
| saponification number | 191 | 191.7 |

EXAMPLE 6

Table 5 lists the results of hydrogenating soy bean oil in terms of the time required at various temperatures. The values given at 120°C are the same as those given in Example 4.

The data in Table 5 show that the catalyst of the invention is still very active at very low temperatures and its selectivity can be controlled by suitable choice of temperature.

TABLE 5

|  | Starting oil | Hydrogenated oil | | |
|---|---|---|---|---|
| Temp. (°C) | — | 100 | 120 | 140 |
| $H_2$ pressure (at.) | — | 1 | 1 | 1 |
| Hydrogenation time (min) | — | 60 | 57 | 60 |
| Catalyst conc. (% w/w Ni in oil) | — | 0.9 | 0.9 | 0.9 |
| $H_2$ absorbed (1/100 g of oil) | — | 2.55 | 5.0 | 7.43 |
| $C_{16}$ palmitic acid (%) | 10.4 | 10.2 | 9.8 | 12.7 |
| $C_{18}$ stearic acid (%) | 4.3 | 6.2 | 7.7 | 32.2 |
| $C_{18}'$ oleic acid (%) | 24.0 | 48.9 | 76.3 | 55.1 |
| $C_{18}''$ linolenic acid(%) | 8.0 | 1.6 | — | — |
| $C_{18}''$ linoleic acid (%) | 52.6 | 32.4 | 4.2 | — |
| Iodine number | 130 | 102 | 74.9 | 46.7 |
| saponification number | 193 | 191 | 189.0 | 189.1 |

We claim:

1. A catalyst for the selective hydrogenation of fats and fatty acids, which has been prepared by calcining a compound of the formula $$Me_6^{(2+)}Al_2(OH)_{16}\cdot CO_3\cdot 4H_2O$$

in which $Me^{(2+)}$ is nickel, copper or cobalt, and reducing said calcined compound with hydrogen at temperatures ranging from 200° to 600°C and in which said compound has been prepared from an aqueous solution, which contained 1M to 2M solutions of the divalent metal salts and of trivalent aluminum salt, by precipitating with a 1M to 2M alkali metal carbonate or bicarbonate solution at temperatures ranging from 50° to 95°C and a pH of from 4.0 to 8.5 and then washing, filtering and drying to obtain said compound.

2. A catalyst as set forth in claim 1, wherein the precipitation of the compound  $Me_6^{(2+)}Al_2(OH)_{16}\cdot CO_3\cdot 4H_2O$ has been effected at temperatures ranging from 75° to 85°C and at pH's ranging from 4.5 to 6.5.

* * * * *